United States Patent [19]
Goodman et al.

[11] Patent Number: 4,759,553
[45] Date of Patent: Jul. 26, 1988

[54] DYNAMIC ROTARY FACE SEAL

[75] Inventors: James R. Goodman, Columbia, S.C.; Stephen A. Sekulich, Brighton, Mich.; Terry M. Lewis, Columbia, S.C.; Dean R. Bainard, Lake Wylie, S.C.; Dick L. Kanitz, Columbia, S.C.

[73] Assignee: The Fluorocarbon Company, Laguna Niguel, Calif.

[21] Appl. No.: 822,740

[22] Filed: Jan. 27, 1986

[51] Int. Cl.$^4$ ............... F16J 15/32; F16J 15/34; F16J 15/54
[52] U.S. Cl. ................... 277/39; 277/58; 277/63; 277/71; 277/74; 277/75; 277/95; 277/96.1; 277/153
[58] Field of Search ............ 277/38, 39, 65, 95, 277/153, 94, 75, 96.1, 152, 174, 177, 83, 47, 51, 40, 41, 71, 74, 58, 63; 384/481, 482, 139, 140

[56] References Cited

U.S. PATENT DOCUMENTS

| | | | |
|---|---|---|---|
| 1,931,733 | 10/1933 | Leibing | 277/95 X |
| 1,963,849 | 6/1934 | Johnson | 277/51 |
| 2,202,908 | 6/1940 | Hubbard | 277/174 X |
| 2,554,488 | 5/1951 | Carr | 277/39 |
| 2,561,694 | 7/1951 | Gilbert, Sr. | 277/39 X |
| 2,593,899 | 4/1952 | Krug | 277/40 |
| 2,831,713 | 4/1958 | Smith | 277/95 X |
| 2,888,281 | 5/1959 | Ratti | 277/38 X |
| 2,958,551 | 11/1960 | Rogers | 277/152 X |
| 3,195,904 | 7/1965 | Gilbert | 277/95 |
| 3,421,768 | 1/1969 | Ludwig | 277/95 X |
| 3,499,653 | 3/1970 | Gardner | 277/96.1 |
| 3,656,824 | 4/1972 | Ullberg | 277/95 X |
| 3,857,156 | 12/1974 | Clark | |
| 3,929,341 | 12/1975 | Clark | |
| 3,939,551 | 2/1976 | Clark et al. | |
| 3,973,781 | 8/1976 | Grovich | 277/96.1 X |
| 3,985,487 | 10/1976 | Clark | |

FOREIGN PATENT DOCUMENTS

| | | | |
|---|---|---|---|
| 710143 | 7/1941 | Fed. Rep. of Germany | 277/95 |
| 2260039 | 8/1975 | France | 277/95 |
| 727814 | 4/1955 | United Kingdom | 277/152 |
| 1388056 | 3/1975 | United Kingdom | 277/174 |

*Primary Examiner*—Allan N. Shoap
*Attorney, Agent, or Firm*—Knobbe, Martens, Olson & Bear

[57] ABSTRACT

A seal element is positioned within an outer casing and has an anchoring portion which is sealingly secured to the periphery of a rotating shaft by a surrounding coil spring. A radial portion on the seal element extends radially outward from the anchoring portion and passes between two spaced washers, providing a dynamic seal therebetween. An arm extends from one face of the seal element radial portion to resiliently bias the radial portion into engagement with the washers. A spiral hydrodynamic groove on the other face of the seal element radial portion automatically pumps fluid back to the fluid side of the seal apparatus as the shaft and seal element rotate together.

10 Claims, 1 Drawing Sheet

U.S. Patent    Jul. 26, 1988    4,759,553
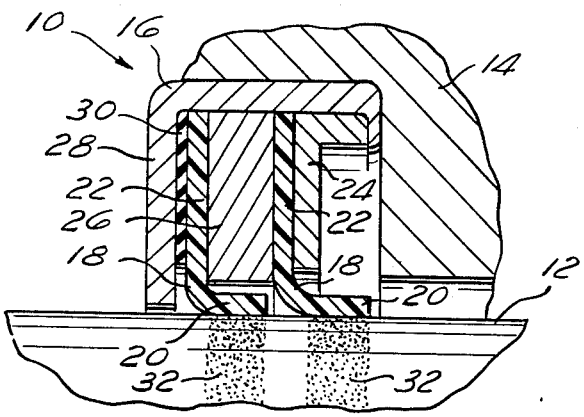
Fig. 1 (PRIOR ART)
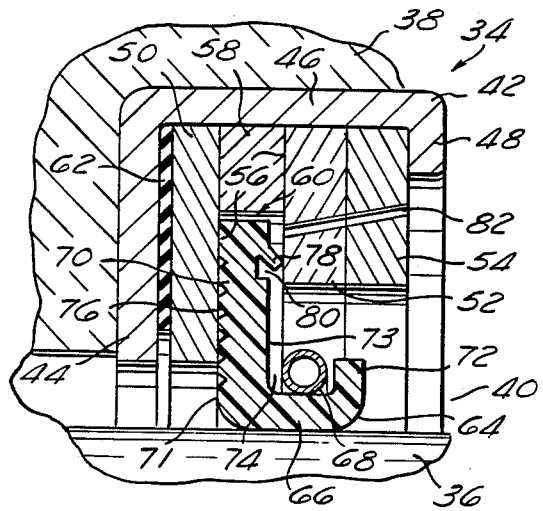
Fig. 2
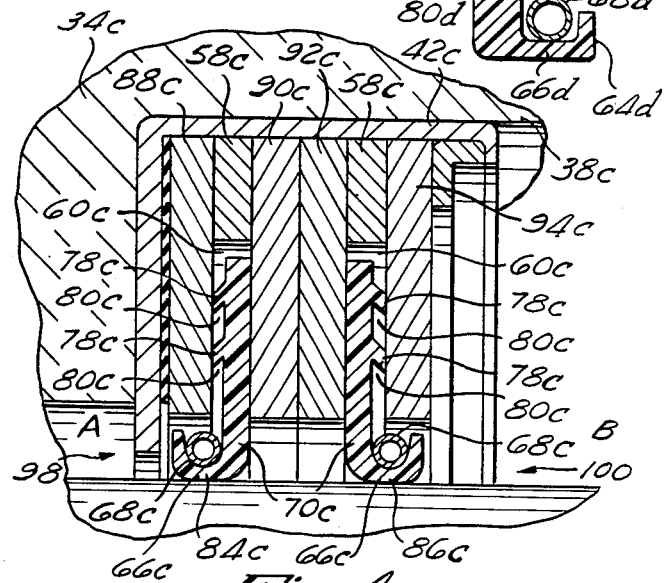
Fig. 7
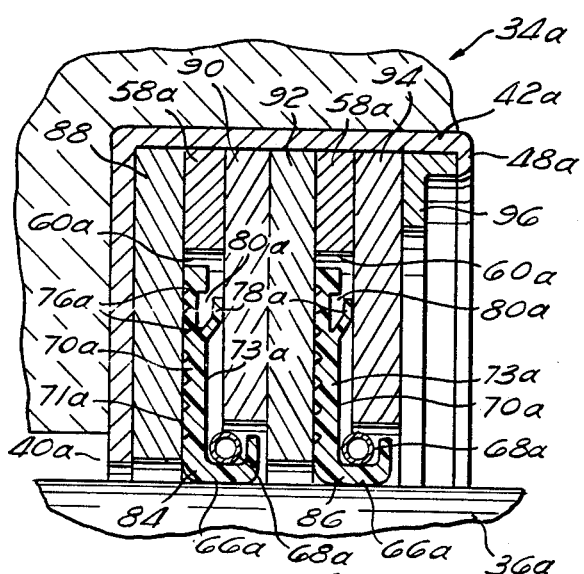
Fig. 3
Fig. 4
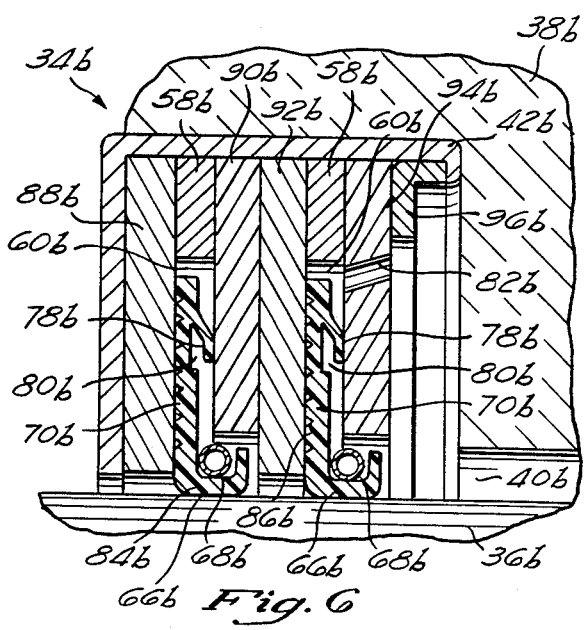
Fig. 5
Fig. 6

DYNAMIC ROTARY FACE SEAL

BACKGROUND OF THE INVENTION

This invention relates generally to a fluid sealing apparatus, and more particularly to a rotary seal.

Radial lip seals are frequently used to provide a fluid seal around a rotating shaft. Typically, these lip seals include an annular outer casing which is secured to the structure surrounding the shaft, and one or more annular seal elements which are held stationary within the outer casing. Each seal element has a cylindrical lip portion which sealingly bears against the shaft. The seal elements also include a radial portion which extends radially outwardly from the lip and which is clamped within the casing so that the seal element remains stationary.

The performance of conventional lip seals under certain operating conditions has been unsatisfactory. Due to the rubbing of the stationary seal element on the rotating shaft, the surface of the shaft which contacts the seal element becomes worn or scored. While shaft scoring can be minimized by using a seal element manufactured from polytetrafluoroethylene and having no abrasive fillers, this often leads to premature seal failure due to rapid wear of the seal element.

Since the lip must always remain in contact with the shaft to form a seal, previous lip seal designs have also been unable to operate satisfactorily when the shaft is significantly misaligned. Likewise, the operation of lip seals is limited in situations where shaft "run-out" or eccentricity is prevalent.

Lip seal performance is also adversely affected by poor or damaged shaft finishes, soft shaft materials, and abrasive fluids. In applications where one or more of the above conditions exist, seal life is often minimal. Since the worn seal element is permanently housed within the casing, the entire seal assembly must be replaced when the seal element is worn. Further, in order to remove the seal assembly, which is generally press-fit into place, the device in which the seal assembly is installed often must be disassembled first.

Thus, a need exists for a rotary seal which is longlasting, easily replaced, and able to perform in adverse operating conditions.

SUMMARY OF THE INVENTION

The present invention comprises an annular seal element having an anchoring portion which is secured to a rotating shaft to provide a static seal against the shaft, and a radial portion which extends radially outward from the anchoring portion and provides a dynamic seal between a pair of stationary, axially spaced planar surfaces. The planar surfaces are preferably located on a pair of annular washers which surround the shaft and are mounted within a casing which is typically fixed to a stationary structure surrounding the shaft. The washers are spaced axially to define a cavity into which the radial portion extends.

One face of the radial portion is spaced from one washer by a resilient, annular lever arm. The lever arm provides a dynamic seal between the radial portion and the washer. Preferably, one end of the arm is attached to the radial portion, and the other end of the cam abuts the washer to define an annular channel adjacent the radial portion. The open end of the channel is directed so that the fluid being sealed on the fluid side of the seal element fills the channel and further forces the arm into sealing engagement with the washer.

The other face of the radial portion sealingly engages the other washer, and has a spiral groove which pumps fluid either radially inwardly or radially outward as the sealing element rotates relative to the washer. A bleed hole may be provided through the washer adjacent the fluid side to provide fluid communication between the fluid side and the cavity into which the radial portion extends. The direction of the spiral groove is selected with respect to the direction of rotation of the shaft so that the fluid is returned to the fluid side as the groove pumps the fluid.

Alternatively, an annular lever arm can extend from both faces of the radial portion. In one embodiment, both arms extend in the same direction and each define a radially inwardly facing channel.

Preferably, the anchoring portion of the seal element is cylindrical in shape and is secured to the shaft by means of a ring shaped coil spring. The radial portion extends radially outward from the anchoring portion at one end, and a upturned end extends radially outward from the other end of the anchoring portion, so that the seal element has an L-shaped cross section. The anchoring portion, radial portion, and upturned end define a channel in which the coil spring is retained.

The seal element is part of a seal assembly which comprises an annular outer casing which surrounds the shaft and is fixed to the surrounding structure. More than one seal element may be provided within the outer casing so that one seal element can act as a backup for another seal element. Also, two seal elements may be utilized within a sealing apparatus which maintains a first fluid on one side of the seal assembly separate from a second fluid on the other side of the seal assembly.

BRIEF DESCRIPTION OF THE DRAWINGS

FIG. 1 is a cross-sectional view of a prior art lip seal.

FIG. 2 is a perspective view of the radial portion of a seal element according to the present invention.

FIG. 3 is a cross-sectional view of a seal apparatus according to one embodiment of the present invention employing a single seal element.

FIG. 4 is a cross-sectional view of a seal apparatus according to another embodiment of the invention, in which a different fluid is present on each side of the seal apparatus.

FIG. 5 is a cross-sectional view of a seal apparatus according to another embodiment of the invention employing a pair of seal elements.

FIG. 6 is a cross-sectional view of a seal apparatus according to another embodiment of the invention employing a pair of seal elements.

FIG. 7 is a cross-sectional view of a seal element according to yet another embodiment of the invention, in which a lever arm extends from both sides of the seal element.

DETAILED DESCRIPTION OF THE PREFERRED EMBODIMENT

Referring to FIG. 1, a typical prior art lip seal assembly 10 is shown surrounding a cylindrical shaft 12 so as to provide a fluid seal between the shaft 12 and a surface or structure 14 surrounding the shaft 12. The seal assembly 10 includes a metallic, annular outer casing 16 secured to the structure 14. A pair of flexible Teflon seal elements 18 are mounted within the outer casing 16. Each seal element 18 includes a substantially cylindrical lip portion 20 which sealingly contacts the shaft 12, and an annular radial portion 22 extending radially outward from the lip portion 20.

The radial portion 22 of one seal element 18 is clamped between an L-shaped, annular inner case 24 and an annular washer 26. The other seal element 18 is clamped between the washer 26 and a radial flange 28 on the outer casing 16. An annular gasket 30 formed of a suitable resilient material is placed between the radial flange 28 and the seal element 18 so that as the radial portions 22 "cold flow", or become narrower under compression, the gasket 30 will resiliently expand, and maintain a clamping force on the seal elements 18.

The seal elements 18 are held stationary within the outer casing 16 so that a dynamic seal is provided between the lip 20 and the shaft 12. Since the lip 20 is constantly rubbing against the shaft 12, the surface of the shaft 12 becomes worn or scored where the seal element 20 contacts the shaft 12, as indicated by the shaded portions 32 on the shaft 12.

Another drawback of this type of lip seal 10 is that the lip portion 20 must remain in contact with the entire periphery of the shaft 12 at all times in order to form a seal. Thus, the seal element 18 cannot remain in sealing engagement with the shaft 12 if the shaft 12 has become misaligned or eccentric to a significant degree.

Replacement of the sealing elements 18 after they have become worn is also difficult since the sealing elements 18 are not removable from the outer casing 16. Thus, the entire seal assembly 10 must be replaced. Further, the outer casing 16 is generally press-fit into place on the structure 14, and thus the entire device in which the seal assembly 10 is utilized often must be disassembled in order to have sufficient access to the remove the seal assembly 10.

Turning now to the present invention, a seal assembly 34 is shown in FIG. 3 which provides a fluid seal between a cylindrical shaft 36 and a surrounding structure 38. The shaft 36 rotates relative to the surrounding structure 38, but for purposes of the invention, it is irrelevant whether the shaft 36 is stationary and the surrounding structure 38 rotates, or vice versa. The seal assembly 34 has a fluid side 40, which is adjacent a reservoir of fluid (not shown) to be sealed.

The seal assembly 34 includes an annular outer casing 42 which has an inside diameter larger than the diameter of the shaft 36, to permit the shaft 36 to pass through the center of the outer casing 42. The outer casing 42 has a generally L-shaped cross section formed by a radial flange 44 which extends radially outward from the shaft 36 within a radial plane of the shaft 36. A radial plane is a plane normal to the central axis of the shaft 36, and in which radii of the shaft 36 lie. The outer casing 42 also includes a cylindrical portion 46 which extends axially along a portion of the shaft 36. The radial flange 44 is normal to one end of the cylindrical portion 46, and a curled end portion 48 extends radially inward from the other end of the cylindrical portion 46.

A plurality of annular washers 50, 52, and 54 also surround the shaft 36 and are positioned within the outer casing 42, between the radial flange 44 and the curled end portion 48. The washers 50, 52 each have a planar face 56 which is in a radial plane, and is parallel to the radial flange 44. The outside diameters of the washers 50, 52 and 54 are chosen so that they abut the inside diameter of the outer casing cylindrical portion 46.

Washers 50 and 52 are spaced axially by an annular spacer ring 58. The inside diameter of the spacer ring 58 is greater than that of any of the other washers 50, 52 or 54, so that the spaced washers 50 and 52 and the spacer ring 58 define an annular cavity 60 surrounding the shaft 36. Between the radial flange 44 and the washer 50 is a resilient, annular gasket 62.

The washers 50, 52 and 54, the spacer ring 58 and the gasket 62 are stacked coaxially and clamped into the outer casing 42 between the radial flange 44 and the curled portion 48.

An annular seal element 64 is also provided within the outer casing 44. The seal element 64 includes a cylindrical anchoring portion 66 which contacts the perihery of the shaft 36 and forms a static seal against the shaft 36. To maintain the anchoring portion 66 in sealing engagement with the shaft 36, a ring shaped coil spring 68 surrounds the anchoring portion 66 and biases the anchoring portion 66 into engagement with the surface of the shaft 36. Because of this bias, the seal element 64 remains stationary relative to the shaft 36, even as the shaft 36 rotates. Alternatively, other suitable fastening means can be substituted for the coil spring 68.

The seal element 64 further comprises an annular radial portion 70 which extends radially outward from one end of the anchoring portion 66, and into the cavity 60. Preferably, the radial portion 70 extends substantially normal to the anchoring portion 66 so as to be in a radial plane. At the other end of the anchoring portion 66 is an upturned end 72 which also extends radially outward, and is substantially parallel to the radial portion 70. The radial portion 70, the anchoring portion 66, and the upturned end 72 form the L-shaped cross-section of the seal element 64, and define a channel 74 around the anchoring portion 66 in which the spring 68 is retained.

The left face 71 of the radial portion 70 abuts directly against the planar face 56 of the washer 50. A spiral groove 76 is cut into this left face, as is best shown in FIG. 2. The groove 76 provides a flow path between the left face 71 and the washer 50 which begins at the inside diameter of the radial portion 70 and terminates at the outside diameter of the left face 71. The groove 76 serves as a hydrodynamic thread which pumps fluid entering the groove 76 either radially inward or radially outward, depending on the rotational direction of the shaft 36, and the direction of the groove 76. As used herein, the phrase "direction of the groove" refers to the direction, either clockwise or counterclockwise, that the groove 76 spirals. As will be apparent to those skilled in the art, by selecting the direction of the groove 76 with respect to the rotational direction of the shaft 36, the groove 76 can be used to pump fluid either radially inward or radially outward.

The right face 73 of the radial portion 70 is spaced from the planar surface 56 of the washer 52 by means of a protruding lever arm 78. The arm 78 is annular and is attached to the right face 73 of the radial portion 70 at one end and extends outwardly away from the right face 73 to engage the washer 52 at the other end. A radially inwardly facing channel 80 is defined between the right face 73 and the arm 78. The arm is resilient, and forces the left face 71 into sealing engagement with the washer 50. The arm 78 also sealingly engages the washer 52. It is to be understood that the arm 78 or groove 76 may be on either side of the radial portion 70. However, the arm 78 and groove 76 must be on different sides in order to function properly.

Preferably, the outer casing 42, washers 50, 52, and 54, and spacer ring 58 are metallic, the seal element 64 is preferably formed from a fluorocarbon polymer such as that sold under the trademark Teflon, and the gasket 62 is formed from a resilient material such as that sold under the trademark Viton.

In operation, as the shaft 36 rotates relative to the surrounding surface 38, the anchoring portion 66 of the seal element 64 provides a static seal against the surface of the shaft 36, and the radial portion 70 of the seal element 64 provides a dynamic seal between the washers 50 and 52. The channel 80 faces radially inward, or toward the fluid side 40, so that fluid on the fluid side 40 fills the channel 80 and further forces the arm 78 into sealing engagement with the washer 52. Since the arm 78 is resilient, fluid can flow between the arm 78 and the washer 52 only if it is flowing in a radially inward direction, which is toward the fluid side 40.

Any fluid from the fluid side 40 which passes between the arm 78 and the washer 52 or between the anchoring portion 66 and the shaft 36 will be pumped back toward the fluid side 40 by the groove 76. That is, the direction of the groove 76 is chosen with respect to the rotational direction of the shaft 36 so that fluid will be pumped radially outward, around the radial portion 70 of the seal element 64, and back to the fluid side 40.

A bleed hole 82 is provided through the washers 52 and 54 to provide fluid communication between the cavity 60 and the fluid side 40. Fluid pumped radially outward by the groove 76 will enter the bleed hole 82 and flow back to the fluid reservoir. As will be apparent to those skilled in the art, the bleed hole 82 will be suitable for applications in which there is relatively low fluid pressure, such as "splash" applications.

The outside diameter of the radial portion 70 is less than the inside diameter of the spacer ring 58 so that the seal element 64 may be displaced radially without interfering with the sealing capability of the seal element 64. Thus, the seal assembly 34 is capable of operating in situations where there is a significant degree of shaft misalignment or shaft eccentricity. Further, since the anchoring portion 66 forms a static seal with the shaft 36, the shaft surface does not become scored due to contact with the seal element 64.

Replacement of the seal element 64 when worn is a relatively simple procedure since the radial portion 70 slides freely between the washers 50 and 52. Thus, the seal element 64 can be removed from the outer casing 42 and replaced withoiut requiring removal of the outer casing 42 from the surrounding surface 38. Since the washers 50 and 52 do not provide a clamping action on the seal element, the gasket 62 is optional.

Although not shown, in an alternative embodiment of the invention, the lever arm 78 may be secured to the washer 52 at one end, and extend outwardly to sealingly abut the radial portion 70 at the other end. The arm 78 would then remain stationary while the seal element 64 rotated.

FIGS. 4, 5, 6 and 7 show various preferred embodiments of the present seal apparatus. To indicate parts which are common to the embodiments shown in FIGS. 3–7, the same numerals are used with letter subscripts. Referring first to FIG. 5, a seal assembly 34a is shown in which two seal elements, a left seal element 84 and a right seal element 86, are utilized. Each seal element 84, 86 includes a cylindrical anchoring portion 66a which surrounds the shaft 36a and is secured to the shaft 36a by means of a ring-shaped spring 68a. A radial portion 70a extends radially outwardly from the anchoring portion 66a, and includes a spiral groove 76a on the left face 71a and an annular lever arm 78a on the right face 73a.

The radial portion 70a of the left seal element 84 extends between annular washers 88 and 90, and the radial portion 70a of the right seal element 86 extends between annular washers 92 and 94. Annular spacer rings 58a are provided between the washers 88 and 90 to space the washers 88 and 90 and form a cavity 60a. Likewise, an annular spacer ring 58a is located between the washers 92 and 94 and spaces those washers to form a cavity 60a.

The washers 88, 90, 92, and 94 and spacer rings 58a are held in an axially stacked position within an L-shaped outer casing 42a by means of an annular inner casing 96 which also has an L-shaped cross-section. The inner casing 96 is clamped between a curled portion 48a of the outer casing 42a and the washer 94.

The fluid side 40a of the seal assembly 34a is to the left. The direction of the grooves 76a is chosen with respect to the rotational direction of the shaft 36a so that the fluid being sealed is driven radially inward and toward the fluid side 40a by the hydrodynamic pumping action of the groove 76a. The arm 78a on the seal element 84 extends radially outward to define a radially outward facing channel 80a so that any fluid from the fluid side 40a passing between the radial portion 70a and the washer 90 will be trapped within the channel 80a. Thus, the channel 80a effectively faces toward the fluid side 40a.

The groove 76a and arm 78a of the right seal element 86 are oriented in the same direction as are the groove 76a and arm 78a of the left seal element 84, so that any fluid seeping past the left seal element 84 can be trapped by the right seal element 86. The groove 76a of the right seal element 86 will pump fluid between the radial portion 70a of the left seal element 84 and the washer 90. This pumped fluid flows between the resilient arm 78a of the left seal element 84 and the washer 90 on its path back to the fluid side 40a.

Referring now to FIG. 6, a seal assembly 34b is shown in which the fluid side 40b is to the right. The seal assembly 34b includes an outer casing 42b, inner casing 96b, washers 88b, 90b, 92b, 94b and spacer rings 58b which are similar in structure to those shown in the seal assembly 34a of FIG. 5, with the exception that the washer 94b includes a bleed hole 82b providing fluid communication between the right side cavity 60b and the fluid side 40b.

Like those shown in FIG. 5, the left and right seal elements 84b and 86b each include a cylindrical anchoring portion 66b, and a radially extending radial portion 70b which has a groove 76b on one side and annular arm 78b on the other side. The seal elements 84b, 86b are secured to the shaft 36b by means of ring-shaped coil spring 68b. The radial portion 70b of the right side seal element 86b extends into the cavity 60b formed b8y the washers 92b and 94b, and the radial portion 70b of the left side seal element 84b extends into the cavity 60b formed by the washers 88b and 90b.

The arms 78b of both seal elements 84b, 86b are oriented to define channels 80b which face radially inward, so that the fluid on the fluid side 40b will be trapped within the channels 80b and help force the arms 78b into sealing engagement with the washers 90b and 94b. The direction of the grooves 76b is chosen so that fluid is pumped back toward the fluid side 40b, or radially outward. Fluid pumped radially outward by the groove 76b on the left seal element 84b will flow around the radial portion 70b and radially inward as it passes between the arm 78b and the washer 90b. Fluid pumped toward the fluid side 40b of the seal assembly 34b by the right seal element 86b will flow through the bleed hole 82b and directly to the fluid side 40b.

Turning now to FIG. 4, a seal assembly 34c is shown having a fluid A on the left, or fluid A side 98 and a fluid B on the right, or fluid B side 100. The seal assembly 34c maintains the fluid A and fluid B separated. The seal assembly 34c includes an outer casing 42c, inner casing 96c, washers 88c, 90c, 92c, and 94c, and spacer rings 58c which are similar to those shown in FIGS. 5 and 6.

The seal elements 84c and 86c include cylindrical anchoring portions 66c which surround a shaft 36c and are secured to the shaft 36c by means of a coil springs 68c. The seal elements 84c and 86c also have radial portions 70c which extend into the cavities 60c defined by the washers 88c, 90c, 92c and 94c.

The left seal element 84c includes a pair of arms 78c which extend radially inward, to form radially inwardly facing channels 80c. The channels 80c face toward the fluid A side 98 of the seal assembly 34c, and thus prevent fluid A from seeping past the seal element 84c. Likewise, the right seal element 86c has radially inwardly facing arms 78c which maintain the fluid B on the right side 100 of the seal assembly 34c.

FIG. 7 shows a seal element 64d which includes a cylindrical anchoring portion 66d which can be secured to a cylindrical shaft (not shown) by a coil spring 68d. A radial portion 70d extends radially outwardly from the anchoring portion. On the right face 71d of the radial portion 70d, an annular, resilient right lever arm 78d extends outwardly and radially inwardly, defining a right annular channel 80d adjacent the radial portion 70d. On the left face 73d of the radial portion 70d, a left annular lever arm 78d extends radially inward, defining a left annular channel 80d.

When the seal element 64d is installed in a suitable casing (not shown), each of the arms 78d abuts a surface (not shown) of the casing and provides a dynamic seal between that surface and the radial portion 70d. Since both channels 80d face radially inward, the seal element 64d is particularly well suited for use in applications where different fluid media on each side of the seal element 64d are to be kept separated.

What is claimed:

1. A seal apparatus for providing a fluid seal between a shaft and a structure which surrounds said shaft, said shaft rotating relative to said structure, said seal apparatus comprising:
    an annular seal element adapted to surround said shaft, said seal element having an anchoring portion which sealingly engages the periphery of said shaft and a radial portion extending radially outward from said anchoring portion, said radial portion having axially opposite facing radial faces;
    means for securing said anchoring portion to said shaft so that said seal element is stationary relative to said shaft; and
    first and second planar surfaces surrounding said shaft, said surfaces being spaced axially to form an annular cavity, said seal element radial portion extending into said cavity and providing a dynamic seal between said first surface and said second surface, one face of said radial portion being spaced from the first surface by an annular lever arm which extends between said radial portion and said first surface so as to provide a seal therebetween, wherein the other face of said radial portion sealingly engages said second planar surface.

2. A seal apparatus for providing a fluid seal between a shaft and a structure which surrounds said shaft, said shaft rotating relative to said structure, said seal apparatus comprising:
    an annular seal element adapted to surround said shaft, said seal element having an anchoring portion which sealingly engages the periphery of said shaft and a radial portion extending radially outward from said anchoring portion, said radial portion having axially opposite facing radial faces;
    means for securing said anchoring portion to said shaft so that said seal element is stationary relative to said shaft; and
    first and second planar washers surrounding said shaft, said washers being spaced axially to form an annular cavity, said seal element radial portion extending into said cavity and providing a dynamic seal between said first washer and said second washer, one face of said radial portion being spaced from the first washer by an annular lever arm which extends between said radial portion and said first washer so as to provide a seal therebetween, wherein the other face of said radial portion sealingly engages said second washer, and wherein the face of said radial portion which engages the second washer has a spiral groove therein so that fluid seeping between said radial portion and said second washer enters said groove and is pumped back toward the fluid side of said seal apparatus as said sealing element rotates relative to said washer.

3. The apparatus of claim 2, wherein said first washer is adjacent said fluid side and further includes a bleed hole therethrough to provide fluid communication between said cavity and said fluid side, said bleed hole being positioned radially outward from said arm, the direction of said spiral groove being selected with respect to the direction of rotation of said shaft so that fluid is returned to said fluid side as said groove pumps the fluid radially outward and through said bleed hole.

4. A seal element for providing a seal between a shaft and a surrounding structure, said shaft rotating relative to said structure, wherein said seal element is annular and is adapted to surround said shaft, said seal element comprising:
    a cylindrical anchoring portion which is adapted to extend axially along the periphery of said shaft and sealingly engage said shaft, said anchoring portion biased into engagement with said shaft by a spring means which surrounds said anchoring portion so that said seal element is stationary relative to said shaft, said seal element further comprising:
    a substantially planar radial portion which extends radially outward from one end of said anchoring portion, said radial portion having axially opposite facing radial faces, said radial portion being slidably positioned between first and second annular, axially spaced planar surfaces which are stationary relative to said surrounding structure; and
    an annular lever arm secured to one face of said radial portion at one end and extending outwardly therefrom, the other end of said arm engaging said first planar surface, said arm sealingly engaging said first planar surface and spacing said face from said first surface, said arm and said radial portion defining an annular channel, the open end of said channel facing toward the fluid side of said shaft so that the fluid being sealed will fill said channel and force said arm into sealing engagement with said first planar surface, wherein the other face of said radial portion engages said second planar surface, said arm resiliently biasing said other face into sealing engagement with said second planar surface, wherein said other face includes a spiral groove, the direction of which is chosen with respect to the rotational direction of said shaft so that as said shaft and said seal element rotate, fluid entering said groove is pumped toward the fluid side of said seal element.

5. A seal apparatus for providing a fluid seal between a rotating shaft and a surrounding stationary surface, said seal apparatus comprising:

an annular outer casing surrounding said shaft and fixed to said surface, said outer casing having an L-shaped cross section formed by a cylindrical portion which extends parallel to the central axis of said shaft, and a radial flange on one end of said cylindrical portion, said flange being normal to said cylindrical portion and within a radial plane of said shaft;

a plurality of annular washers within said outer casing having planar faces which are substantially parallel to said outer casing radial face, a first washer and a second washer being spaced apart axially by an annular spacer ring having an inside diameter less than the inside diameter of said washers to form an annular cavity between said washers;

an annular inner case which extends between one of said washers and a curled portion on the other end of said outer casing cylindrical portion, said washers and spacer ring being clamped between said outer casing radial face and said inner casing;

a flexible seal element surrounding said shaft and having a radial portion which extends radially outward from said shaft and into said cavity, said radial portion having axially opposite facing radial faces, said seal element further comprising a cylindrical anchoring portion which sealingly engages the periphery of said shaft, said seal element radial portion being normal to said anchoring portion and extending from one end of said anchoring portion, the other end of said anchoring portion being upturned, a coil spring which surrounds said anchoring portion and is retained by said upturned end to secure said seal element to said shaft so that said seal element rotates with said shaft and thus does not wear the surface of the shaft which contacts the anchoring portion, one face of said seal element radial portion sealingly abutting the second washer;

an arm extending from the other face of said seal element radial portion, said arm sealingly engaging the first washer so that said seal element radial portion provides a dynamic seal between said washers, said arm extending either radially inward or radially outward to form a channel which faces toward the fluid side of said seal apparatus, the outside diameter of said radial portion being less than the outside diameter of said cavity so that said seal element can be displaced in a radial direction to compensate for eccentricity or misalignment of said shaft, said radial portion being slidable between said washers so that said seal element can be replaced while said outer casing, washers and inner casing remain intact; and a spiral groove on the face of said seal element radial portion which engages said second washer, said groove extending from the inside diameter of said radial portion to the outside diameter of said radial portion, the direction of said spiral being chosen so that fluid seeping between said face and said second washer is automatically pumped toward the fluid side of said seal apparatus as said shaft rotates.

6. The seal apparatus of claim 5 wherein said first washer includes a bleed hole passing therethrough to establish fluid communication between said cavity and the fluid side of said seal, said bleed hole being positioned radially outward of the point where said arm contacts said first washer, the direction of said groove being chosen with respect to the rotational direction of said shaft so that said fluid is pumped radially outward and through the bleed hole by the rotation of said shaft.

7. The seal apparatus of claim 5 wherein a first fluid is being sealed on one side of said sealing apparatus, and a second fluid is being sealed upon the other side of said sealing apparatus, said sealing apparatus further comprising one seal element positioned adjacent the first fluid side of said seal apparatus, the direction of the groove and arm of said seal element being oriented to retain said first fluid on said first fluid side of said seal apparatus, and a second seal element extending into a cavity formed between a third washer and fourth washer positioned within said outer casing, said second seal element being positioned adjacent the second fluid side of said seal apparatus, the direction of the arm and groove of said second seal element being chosen to retain said second fluid on said second fluid side.

8. An apparatus, comprising:

a cylindrical shaft;

a structure which surrounds said shaft, said shaft rotating relative to said structure;

a seal for providing a fluid seal between said shaft and said structure, comprising an annular seal element adapted to surround said shaft, said seal element having an anchoring portion which sealingly engages the periphery of said shaft and a radial portion extending radially outward from said anchoring portion, said radial portion having axially opposite facing radial faces;

means for securing said anchoring portion to said shaft so that said seal element is stationary relative to said shaft; and a set of annular washers adapted to surround said shaft, said washers being spaced axially to form an annular cavity, said seal element radial portion extending into said cavity and providing a dynamic seal between said washers, one face of said radial portion being spaced from a first washer by an annular lever arm, one end of said arm being attached to said radial portion, the other end of said arm abutting said first washer, said arm defining an annular channel adjacent to the radial portion, the fluid being sealed filling said channel so as to force said arm into sealing engagement with said first washer, the other face of said radial portion engaging a second washer.

9. The apparatus of claim 8 wherein said securing means is a ring-shaped coil spring.

10. An apparatus, comprising:

a cylindrical shaft;

a structure which surrounds said shaft, said shaft rotating relative to said structure;

a seal for providing a fluid seal between said shaft and said structure, comprising an annular seal element adapted to surround said shaft, said seal element having an anchoring portion which sealingly engages the periphery of said shaft and a radial portion extending radially outward from said anchoring portion;

means for securing said anchoring portion to said shaft so that said seal element is stationary relative to said shaft; and a set of annular washers adapted to surround said shaft, said washers being spaced axially to form an annular cavity, said seal element radial portion extending into said cavity and providing a dynamic seal between said washers, one face of said radial portion being spaced from a first washer by an annular lever arm, one end of said arm being attached to said radial portion, the other end of said arm abutting said first washer, said arm defining an annular channel adjacent to the radial portion, the fluid being sealed filling said channel so as to force said arm into sealing engagement with said first washer, the other face of said radial portion engaging a second washer, and wherein the face of said radial portion which engages said second washer includes a spiral groove, the direction of said groove being chosen with respect to the rotational direction of the shaft so that as said shaft and said seal element rotate, fluid entering said groove is pumped toward the fluid side of said seal element.

* * * * *